US006972898B2

(12) United States Patent
Hwang et al.

(10) Patent No.: US 6,972,898 B2
(45) Date of Patent: Dec. 6, 2005

(54) WIDE BAND OPTICAL FIBER AMPLIFIER

(75) Inventors: Seong-Taek Hwang, Pyongtaek-shi (KR); Kwan-Woong Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 340 days.

(21) Appl. No.: 10/374,894

(22) Filed: Feb. 26, 2003

(65) Prior Publication Data
US 2003/0169490 A1 Sep. 11, 2003

(30) Foreign Application Priority Data
Mar. 11, 2002 (KR) .............................. 2002-12835

(51) Int. Cl.[7] .............................................. H04B 10/12
(52) U.S. Cl. ............... 359/349; 359/337.1; 359/341.33
(58) Field of Search ................. 359/337.1, 341.33, 359/349

(56) References Cited

U.S. PATENT DOCUMENTS

| | | | |
|---|---|---|---|
| 5,598,284 A | 1/1997 | Kogushi et al. | ............... 349/33 |
| 6,049,418 A * | 4/2000 | Srivastava et al. | ........ 359/337.4 |
| 6,204,958 B1 * | 3/2001 | Taylor et al. | ............... 359/337 |
| 6,437,907 B1 * | 8/2002 | Yoon et al. | ............ 359/341.32 |
| 6,621,627 B2 * | 9/2003 | Willner et al. | ............... 359/349 |
| 6,646,796 B2 * | 11/2003 | Song et al. | .................. 359/349 |
| 6,674,570 B2 * | 1/2004 | Song et al. | .................. 359/349 |
| 6,785,043 B2 * | 8/2004 | Hwang et al. | ............ 359/337.5 |
| 2002/0181090 A1 * | 12/2002 | Song et al. | .................. 359/349 |
| 2002/0181091 A1 * | 12/2002 | Song et al. | .................. 359/349 |
| 2003/0048977 A1 * | 3/2003 | Hwang et al. | ................. 385/15 |
| 2003/0179442 A1 * | 9/2003 | Hwang | ................... 359/341.41 |
| 2004/0212873 A1 * | 10/2004 | Hwang et al. | .............. 359/333 |
| 2004/0233516 A1 * | 11/2004 | Hwang et al. | .............. 359/349 |

FOREIGN PATENT DOCUMENTS

| | | | |
|---|---|---|---|
| EP | 0942501 A2 | 2/1999 | ............. H01S 3/07 |
| EP | 0935320 A1 | 8/1999 | ............. H01S 3/10 |

OTHER PUBLICATIONS

"High Flattened Gain of Erbium-Doped Fiber Amplifier;" S.T. Hwang et al.; Conference on Optical Fiber Communications (Dallas); Feb. 1997; XP000776446; 1 pg.
"The Novel Structure of C Plus L-Band Erbium-Doped Fiber Amplifier;" S.T. Hwang et al.; 27th European Conference on Optical Communications; Sep. 30, 2001; XP010583440; 2 pgs.

* cited by examiner

Primary Examiner—Jack Keith
Assistant Examiner—Eric Bolda
(74) Attorney, Agent, or Firm—Cha & Reiter, L.L.C.

(57) ABSTRACT

Disclosed is a wide band optical fiber amplifier for amplifying C and L-band optical signal components having an economical configuration, high amplification efficiency while exhibiting a low noise figure. The amplifier includes first and second isolators; first, second, and third amplification units; a distributor; a gain flattening filter; and first and second reflectors. The amplifier receives C and L band optical signals and process the signals by: amplifying C and L band signals; gain flattening the only C band signal twice; amplifying C and L band signals for the second time; splitting the C band signal from L band signal; subjecting L band signal to be amplified three more times; and combining resulting C and L band signals.

15 Claims, 4 Drawing Sheets

WIDE BAND OPTICAL FIBER AMPLIFIER

CLAIM OF PRIORITY

This application makes reference to, incorporates the same herein, and claims all benefits accruing under 35 U.S.C. § 119 arising from an application entitled, WIDE BAND OPTICAL FIBER AMPLIFIER, earlier filed in the Korean Industrial Property Office on Mar. 11, 2002, and there duly assigned Serial No. 2002-12835.

BACKGROUND OF THE INVENTION

1. Field of the Invention

The present invention relates to optical communication systems, and more particularly to an optical fiber amplifier disposed between an optical transmission block and an optical receiver block in an optical communication system.

2. Description of the Related Art

To keep abreast of exponentially growing data demand, wavelength division multiplexing (WDM) optical transmission systems will be required to have expanded transmission bandwidth range. In this regard, a number of active research efforts are ongoing in conjunction with wide band systems that use both the C-band (Conventional band, 1,530 to 1,560 nm) and the L-band (Long band 1,570 to 1,600 nm).

In a conventional optical fiber transmission system, an optical fiber amplifier is adapted to perform an amplification function of transmitted and/or received optical signals. These amplifiers are typically doped with a rare-earth element such as erbium as one example. Such erbium-doped fiber amplifiers have a total bandwidth on the order of about 30 nm. This bandwidth is insufficient to amplify both the C and L-band requiring approximately twice the bandwidth. Raman amplifiers or tellulite-based erbium-doped fiber amplifiers, have a wider amplification bandwidth capable of amplifying both the C and L-bands. However, Raman amplifiers have limited practical utility because they require a high pumping power. Also, tellulite-based erbium-doped fiber amplifiers are based on amplifying techniques which have not been thoroughly proven.

In light of the aforementioned drawbacks, new research is being conducted to develop a wide band erbium-doped fiber amplifier capable of amplifying both the C and L-band based on a conventional silica-based erbium-doped fiber amplifier. However, one drawback of most wide band erbium-doped fiber amplifiers is that they have a configuration in which independent C and L-bands are coupled in parallel.

FIG. 1 is a diagram illustrating the configuration of a known wide band optical fiber amplifier. As shown in the drawing, the conventional wide optical band fiber amplifier includes first and second isolators 110 and 250, a splitter 120, first through third wavelength selective couplers 140, 190, and 220, first through third pumping light source 150, 200, and 230, first and second erbium-doped fibers 160 and 210, a gain flattening filter 170, and a combiner 240.

In operation, the first isolator 110 allows light inputted to the wide band optical fiber amplifier to pass in a forward direction through the wide band optical fiber amplifier, but blocks light flowing in the opposite direction.

The splitter 120 splits the input optical signal into a C-band optical signal and an L-band optical signal, and guides the C-band optical signal to flow along a first path 130 while guiding the L-band optical signal to flow along a second path 180.

The first wavelength selective coupler 140 couples the C-band optical signal outputted from the splitter 120 with a pumping light outputted from the first pumping light source 150, and outputs the resultant amplified C-band optical signal to the first erbium-doped fiber 160.

The first pumping light source 150 outputs a pumping light having a wavelength of 980 nm in order to pump the first erbium-doped fiber 160. That is, to excite the erbium ions in the first erbium-doped fiber 160.

The gain flattening filter 170 serves to flatten the gain of the C-band component of the input optical signal.

The second wavelength selective coupler 190 couples the L-band optical signal received from the splitter 120 with a pumping light received from the second pumping light source 200, and outputs the resultant optical signal to the second erbium-doped fiber 210.

The second pumping light source 200 outputs a pumping light having a wavelength of 980 nm in order to forwardly pump the second erbium-doped fiber 210.

The third wavelength selective coupler 220 sends the amplified L-band optical signal output from the second erbium-doped fiber 210 to the combiner 240 in a forward direction while independently sending a pumping light outputted from the third pumping light source 230 to the second erbium-doped fiber 210 in a backward direction.

The third pumping light source 230 outputs a pumping light having a wavelength of 1,480 nm in order to backwardly pump the second erbium-doped fiber 210.

The second erbium-doped fiber 210 is pumped in both the forward and backward directions by a forward pumping light source received via the second wavelength selective coupler 190 and a backward pumping light source, received via the third wavelength selective coupler 220. The L-band optical signal is amplified by the second erbium-doped fiber 210 via the first wavelength selective coupler 190.

The combiner 240 combines the amplified C-band optical signal with the L-band optical signal, and outputs the combined C and L-band optical signal to the second isolator 250.

The second isolator 250 forwardly outputs the combined C and L-band optical signals applied thereto while blocking light flowing in the opposite direction.

One drawback of the conventional wide band optical fiber amplifier of the prior art, having the configuration above, is that the pumping light sources 150, 200, 230 require high power while exhibiting a low amplification efficiency. A further drawback of the amplifier of FIG. 1 is that since the splitter 120, which exhibits an insertion loss of about 0.7 dB, is arranged upstream from the erbium-doped fibers a reduction in noise figure occurs.

SUMMARY OF THE INVENTION

The present invention relates to a wide band erbium-doped fiber amplifier having an economical configuration and a high amplification efficiency while exhibiting a low noise figure.

Accordingly, the wide band optical fiber amplifier used in an optical transmission system, comprises: a first amplifying unit configured for amplifying an optical signal having C band and L-band optical signal component; a distributor coupled to the first amplifying unit configured for receiving the amplified C and L-band optical signal components via a first path; a gain flattening filter coupled to the distributor for receiving the amplified C and L band optical signal components and for gain flattening only the amplified C band optical signal component; a first reflector coupled to the gain flattening filter for reflecting the amplified gain flattened C band optical signal component and the amplified L band optical signal component back into the distributor, via the gain flattening filter, the first reflector causing the gain flattened optical signal to be gain flattened a second time; a second amplifying unit coupled to the distributor for receiving and amplifying the twice gain flattened amplified C band optical signal component and the amplified L-band optical signal component; the distributor further configured for receiving the amplified C and L band optical signal components and for splitting the amplified C and L band optical signal components into a separate amplified C and L band optical signal components; a third amplifying unit coupled to the distributor and configured for amplifying the separate amplified L-band signal component; a second reflector coupled to the third amplifying unit configured for reflecting the separate amplified L band signal component back to the distributor via the second amplifying unit; the distributor further configured for combining the amplified separate amplified L band signal component with the separate amplified C band signal component and for outputting the combined signal.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT

Now, preferred embodiments of the present invention will be described in detail with reference to the annexed drawings. In the following description of the present invention, a detailed description of known functions and configurations incorporated herein will be omitted when it may make the subject matter of the present invention rather unclear.

Figure 1:
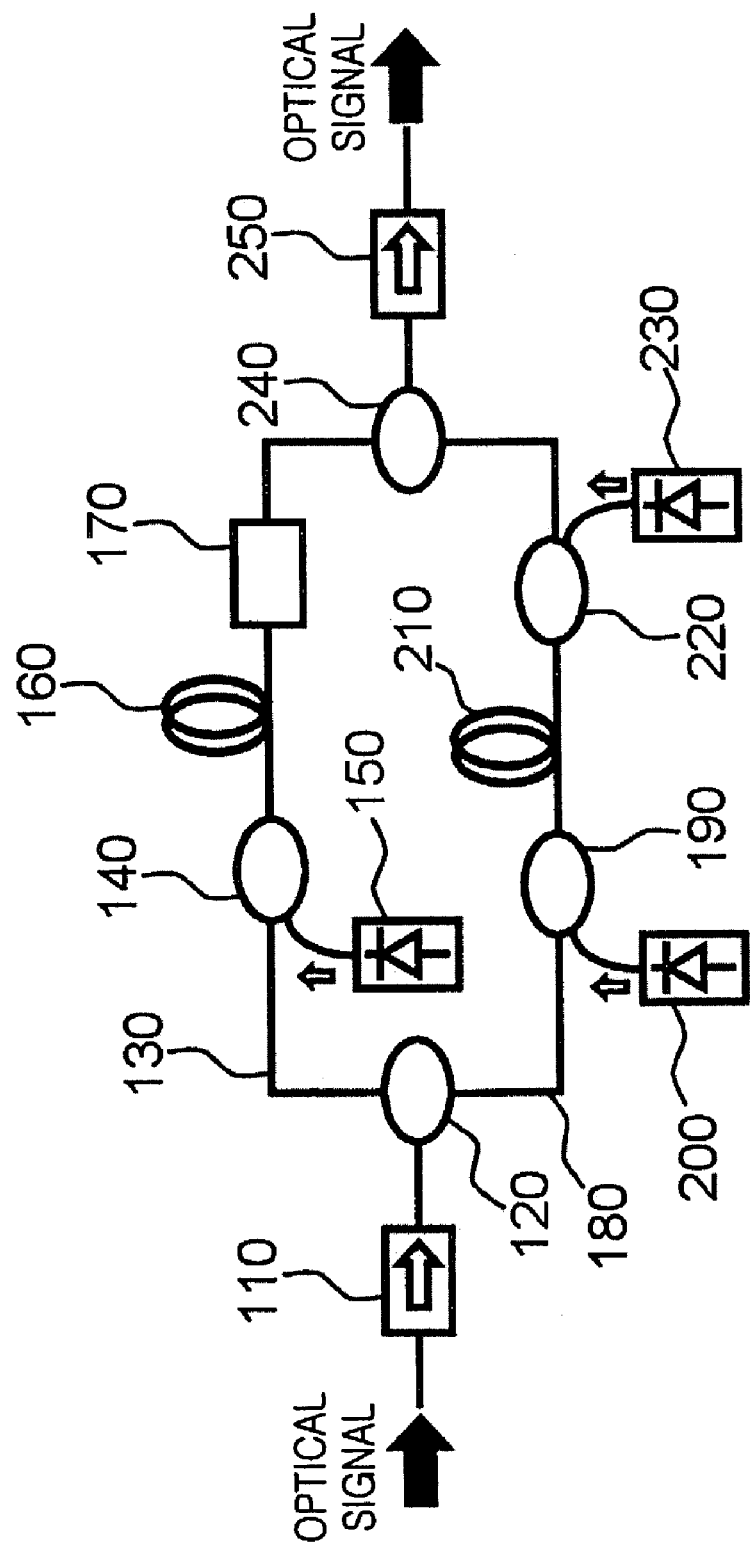
FIG. 1 is a view illustrating the configuration of a conventional wide band optical fiber amplifier according to the prior art.
Figure 2:
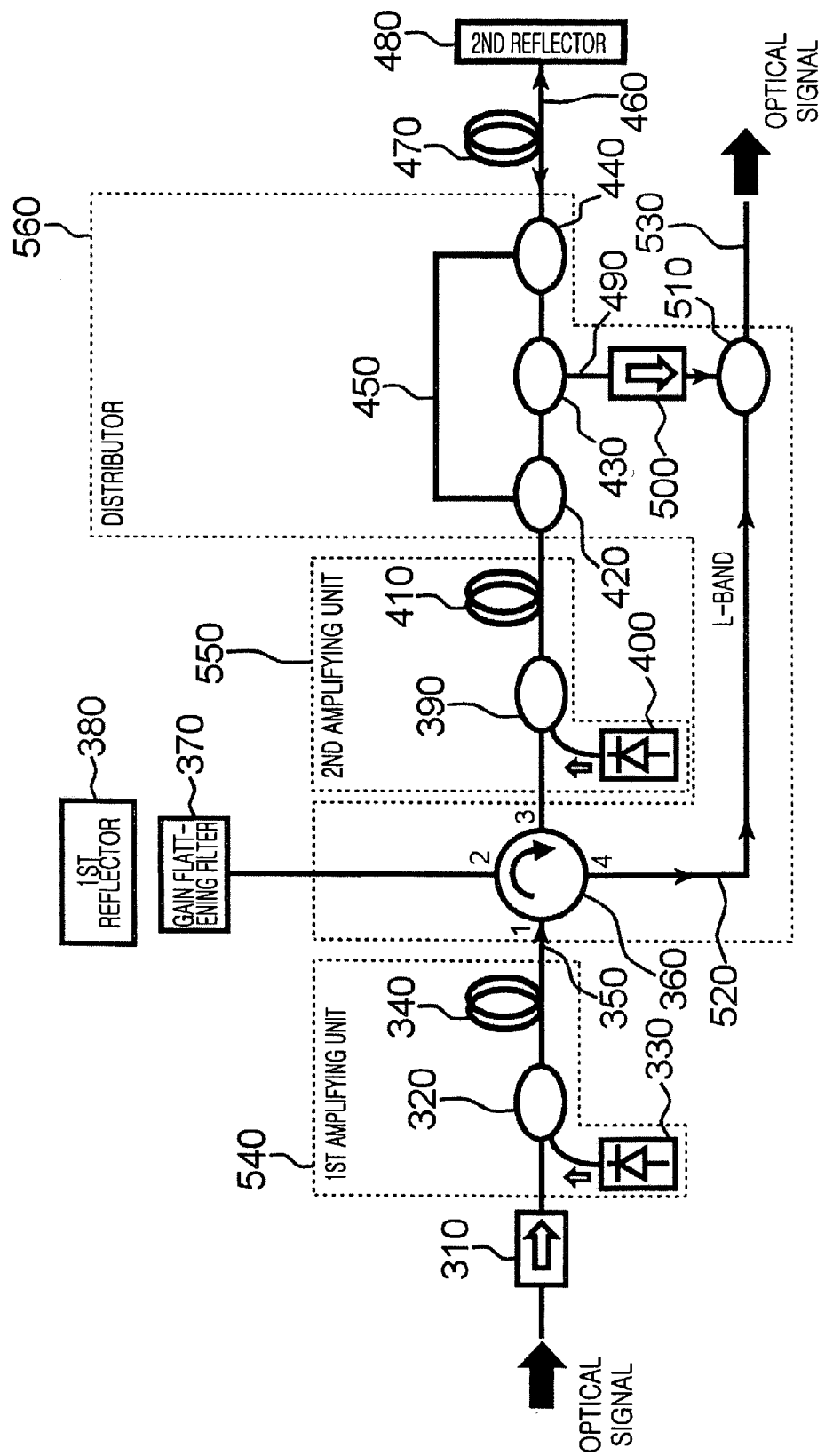
FIG. 2 is a view illustrating a wide band optical fiber amplifier according to a first embodiment of the present invention.

FIG. 2 illustrates the configuration of a wide band optical fiber amplifier according to a first embodiment of the present invention. As shown in FIG. 2, the wide band optical fiber amplifier includes first and second isolators 310 and 500, first through third amplifying units 540, 550, and 470, a distributor 560, a gain flattening filter 370, and first and second reflecting units 380 and 480.

The first isolator 310 allows light inputted to the wide band optical fiber amplifier to pass in a forward direction, while preventing (blocking) light from flowing in a backward direction.

The first amplifying unit 540 includes a first wavelength selective coupler 320, a first pumping light source 330, and a first erbium-doped fiber 340.

The first wavelength selective coupler 320 couples C and L-band optical signal components received from the first isolator 310 with a pumping light outputted from the first pumping light source 330, and outputs a coupled C and L-band optical signal components to the first erbium-doped fiber 340.

The first pumping light source 330 outputs a pumping light having a wavelength of 980 nm in order to pump the first erbium-doped fiber 340. That is, to excite the erbium ions in the first erbium-doped fiber 340.

The first erbium-doped fiber 340 is pumped by the pumping light received from the first pumping light source 330 via the first wavelength selective coupler 320, thereby amplifying the C and L-band optical signal components received via the first wavelength selective coupler 320. The first amplifying unit 540 outputs the C and L-band optical signal components to a distributor unit 560 as will be described.

The distributor 560 receives the amplified C and L-band optical signal components from the first amplifying unit 540. The distributor 560 includes a circulator 360, a splitter 430, a combiner 510, and third and fourth wavelength selective couplers 420 and 440.

The circulator 360 receives the amplified C and L-band optical signal components via a first path 350 at a first port of the circulator and outputs the amplified C and L-band signals at a second port of the circulator. The circulator 360 also outputs the C and L-band optical signal components, received through the second circulator port, at a third circulator port thereof, and outputs the L-band optical signal component, received through the third port, at a fourth port thereof.

The circulator 360 also may be required to prevent an amplified spontaneous emission (ASE) generated from the second and third erbium-doped fibers 410 and 470 from flowing backward into the first erbium-doped fiber 340, thereby avoiding a degradation in amplification efficiency.

The splitter 430 guides the C-band optical signal component output from the third port of the circulator 360 to flow along a fifth path 490, while guiding the L-band optical signal component to flow along a third path 460.

The second isolator 500 allows the C-band optical signal component received from the splitter 430 to pass forward therethrough, while blocking light flowing in the opposite direction.

The third and fourth wavelength selective couplers 420 and 440 perform a pumping operation for the third amplifying unit 470 (i.e., the third erbium amplifier) by use of a residual pumping light outputted from the second amplifying unit 550. That is, the third wavelength selective coupler 420 is arranged between the second amplifying unit 550 and the splitter 430 to output the residual pumping light outputted from the second amplifying unit 550 to a sixth path 450. The sixth path 450 coupling the second amplifying unit 550 with the fourth wavelength selective coupler 440. The fourth wavelength selective coupler 440 being arranged between the splitter 430 and the third amplifying unit 470 to output, to the third amplifying unit 470, the residual pumping light received via the sixth path 450.

The combiner 510 combines the L-band optical signal component received via a fourth path 520 with the C-band optical signal component received via the fifth path 490, and outputs the combined optical signal via a seventh path 530 to the optical receiver (not shown). The gain flattening filter 370 serves to flatten the gain of the C-band component of the optical signal received via the second port of the circulator 360 two times, and a second time by virtue of the first reflector 380. Accordingly, the maximum insertion loss of the gain flattening filter 370 required for gain flattening can be reduced by half. The first reflecting unit 380 reflects the C and L-band optical signal components received from the gain flattening filter 370 so that the reflected optical signal components are re-applied to the gain flattening filter 370.

The third amplifying unit 560 comprises a third erbium-doped fiber 470. The third erbium-doped fiber 470 is pumped by a pumping light that is received via the fourth wavelength selective coupler 440, thereby amplifying the L-band optical signal component received from the splitter 430 and the L-band optical signal component re-applied thereto.

The second reflecting unit 480 reflects the L-band optical signal component received from the third erbium-doped fiber 470 so that the reflected L-band optical signal component is re-applied to the third erbium-doped fiber 470.

The second amplifying unit 550 includes a second wavelength selective coupler 390, a second pumping light source 400, and a second erbium-doped fiber 410.

The second wavelength selective coupler 390 couples C and L-band optical signal components received via the third port of the circulator 360 with a pumping light received from the second pumping light source 400, and outputs the resultant optical signal to the third erbium-doped fiber 410.

The second pumping light source 400 outputs a pumping light having a wavelength, of 480 nm in order to pump the second erbium-doped fiber 410. That is to excite the erbium ions in the second erbium-doped fiber 410.

The second erbium-doped fiber 410 is pumped by the pumping light received via the second wavelength selective coupler 390, thereby amplifying the C and L-band lights received via the second wavelength selective coupler 390.

Operational Description of the First Embodiment

The operation of the wide band fiber amplifier having the above described configuration will now be described with reference to FIG. 2. C and L-band The C and L-band optical signal components are inputted to the wide band optical fiber amplifier. The C and L-band signals first pass through the first isolator 310, and then enter the first amplifying unit 540. In the first amplifying unit 540, the C and L-band optical signal components are input to the first wavelength selective coupler 320 which couples the C and L-band signals with the pumping light output from the first pumping light source 330 to amplify the C and L-band signals in the first erbium-doped fiber 340. After being amplified in the first erbium-doped fiber 340, the amplified C and L-band optical signal components are then applied to a distributor 560. In the distributor 560, the amplified C and L-band signals are applied to the first port of the circulator 360. The circulator 360 outputs the amplified C and L-band signals at the second port, at which point only the C band component is twice subjected to a gain flattening procedure in the gain flattening filter 370. This process occurs twice as a consequence of the signals being reflected by the first reflector 380. Subsequently, the twice gain flattened C band optical signal component and L-band optical signal component, output from the gain flattening filter 370 are re-applied to the second port of the circulator 360. The circulator 360 then outputs the C and L-band optical signal components at the third port of the circulator 360, so as to apply the C and L-band optical signal components to the second erbium-doped fiber 410 via the second wavelength selective coupler 390. After being amplified in the second erbium-doped fiber 410, the C and L-band optical signal components are applied to the splitter 430 via the third wavelength selective coupler 420. The splitter 430 splits the C and L-band signals and guides the C-band optical signal component along the fifth path 490 while guiding the L-band optical signal component along the third path 460. The L-band optical signal component is then amplified two times in the third erbium-doped fiber 470 by virtue of the second reflecting unit 480 and then re-applied to the second erbium-doped fiber 410 after passing through the fourth wavelength selective coupler 440, the splitter 430, and the third wavelength selective coupler 420, in this order. The second erbium-doped fiber 410 then re-amplifies the L-band optical signal component, and then outputs the re-amplified L-band optical signal component. The re-amplified L-band optical signal component is then re-applied to the third port of the circulator 360 via the second wavelength selective coupler 390. The circulator 360, upon receiving the re-amplified L-band optical signal component at the third port, outputs the L-band optical signal component through the fourth port of the circulator 360 along a fourth path 520.

The combiner 510 combines the C-band optical signal component received via the fifth path 490 with the re-amplified L-band optical signal component received via the fourth path 520, and outputs the combined optical signal along the seventh path 530 to an optical receiver (not shown).

Second Embodiment

Figure 3:
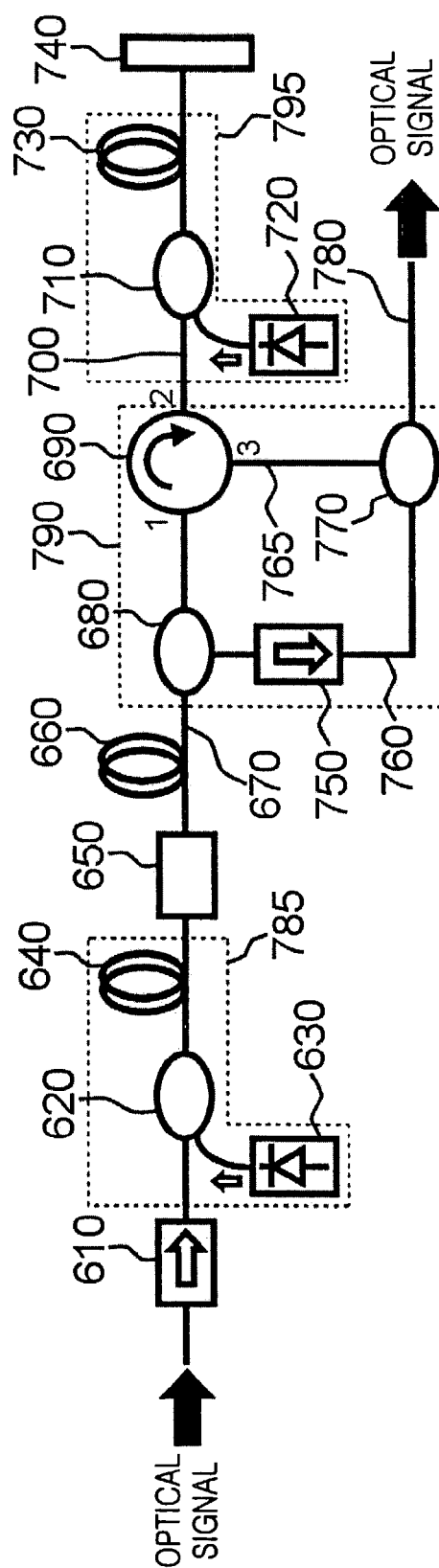
FIG. 3 is a view illustrating a wide band optical fiber amplifier according to a second embodiment of the present invention.

FIG. 3 illustrates the configuration of a wide band optical fiber amplifier according to a second embodiment of the present invention. As shown in FIG. 3, the wide band optical fiber amplifier includes first and second isolators 610 and 750, first through third amplifying units 785, 660, and 795, a gain flattening filter 650, a distributor 790, and a reflecting unit 740.

The first isolator 610 allows light inputted to the wide band optical fiber amplifier to pass forward through the wide band optical fiber amplifier, while blocking light flowing in the opposite direction.

The first amplifying unit 785 includes a first wavelength selective coupler 620, a first pumping light source 630, and a first erbium-doped fiber 640.

The first wavelength selective coupler 620 couples C and L-band optical signal components received from the first isolator 610 with a pumping light received from the first pumping light source 630, and outputs the coupled C and L-band optical signal components to the first erbium-doped fiber 640.

The first pumping light source 630 outputs a pumping light having a wavelength of 980 nm in order to pump the first erbium-doped fiber 640. That is, to excite the erbium ions in the first erbium-doped fiber 640.

The first erbium-doped fiber 640 is pumped by the pumping light received from the first pumping light source 630 via the first wavelength selective coupler 620, thereby amplifying the C and L-band lights received via the first wavelength selective coupler 620.

The gain flattening filter 650 flattens the gain of only the C-band component in the C and L-band optical signal components received from the first erbium-doped fiber 640.

The third amplifying unit 795 includes a second wavelength selective coupler 710, a second pumping light source 720, and a third erbium-doped fiber 730.

The second wavelength selective coupler 710 couples the L-band optical signal component received via the second port of the circulator 690 with a pumping light received from the second pumping light source 720, and outputs the resultant optical signal to the third erbium-doped fiber 730.

The second pumping light source 720 outputs a pumping light having a wavelength of 1,480 nm in order to pump the third erbium-doped fiber 730. That is, to excite the erbium ions in the third erbium-doped fiber 730.

The third erbium-doped fiber 730 is pumped by the pumping light received from the second pumping light source 720 via the second wavelength selective coupler 710, thereby amplifying the L-band optical signal component received via the second wavelength selective coupler 710.

The reflecting unit 740 reflects the L-band optical signal component received from the third erbium-doped fiber 730 so that the reflected L-band optical signal component is re-applied to the third erbium-doped fiber 730.

The distributor 790 includes a splitter 680, a circulator 690, and a combiner 770.

The splitter 680 splits the optical signal received from the second erbium-doped fiber 660 into respective C and L-band optical signal components, and sends the C-band optical signal component to a fifth path 760 while sending the L-band optical signal component to the circulator 690.

The second isolator 750 allows the C-band optical signal component received from the splitter 680 to pass in a forward direction while blocking light flowing in the opposite direction.

The circulator 690 outputs the L-band optical signal component, received at its first port, to a second path 700 through its second port. The circulator 690 simultaneously outputs the L-band optical signal component, received at its second port, to a fourth path 765 through its third port.

The combiner 770 combines the L-band optical signal component received via the fourth path 765 with the C-band optical signal component received via the fifth path 760, and outputs the combined optical signal to a third path 780.

The second amplifying unit 660 comprises the second erbium-doped fiber 660.

The second erbium-doped fiber 660 is pumped by a pumping light received via the gain flattening filter 650, thereby amplifying the C and L-band optical signal components received from the gain flattening filter 660.

The operation of the wide band fiber amplifier having the above described configuration will now be described. C and L-band Operational Description of the Second Embodiment In operation, when C and L-band optical signal components are inputted to the wide band optical fiber amplifier, the C and L-band signals are first pass through the first isolator 610, and then the first wavelength selective coupler 620, after which the C and L-band signals then enter the first erbium-doped fiber 640. After being amplified in the first erbium-doped fiber 640, the C and L-band optical signal components are applied to the gain flattening filter 650 which flattens the gain of only the C-band component of the applied optical C and L-band signals. Thereafter, the C and L-band optical signal components are amplified by the second erbium-doped fiber 660, and then applied to the splitter 680. This splitter 680 splits the optical signal applied thereto into C and L-band optical signal components respectively, and outputs the C-band optical signal component to the fifth path 760 while outputting the L-band optical signal component to the circulator 690. The circulator 690 outputs the L-band optical signal, received thereto, through its second port. This L-band optical signal is amplified twice in the third erbium-doped fiber 730 by virtue of the reflecting unit 740, and thereafter applied to the second port of the circulator 690 via the second wavelength selective coupler 710. The circulator 690 outputs the L-band optical signal, received at its second port, to the fourth path 765 through its third port. The combiner 770 combines the L-band optical signal received via the fourth path 765 with the C-band optical signal received via the fifth path 760, and outputs the combined optical signal.

Third Embodiment

Figure 4:
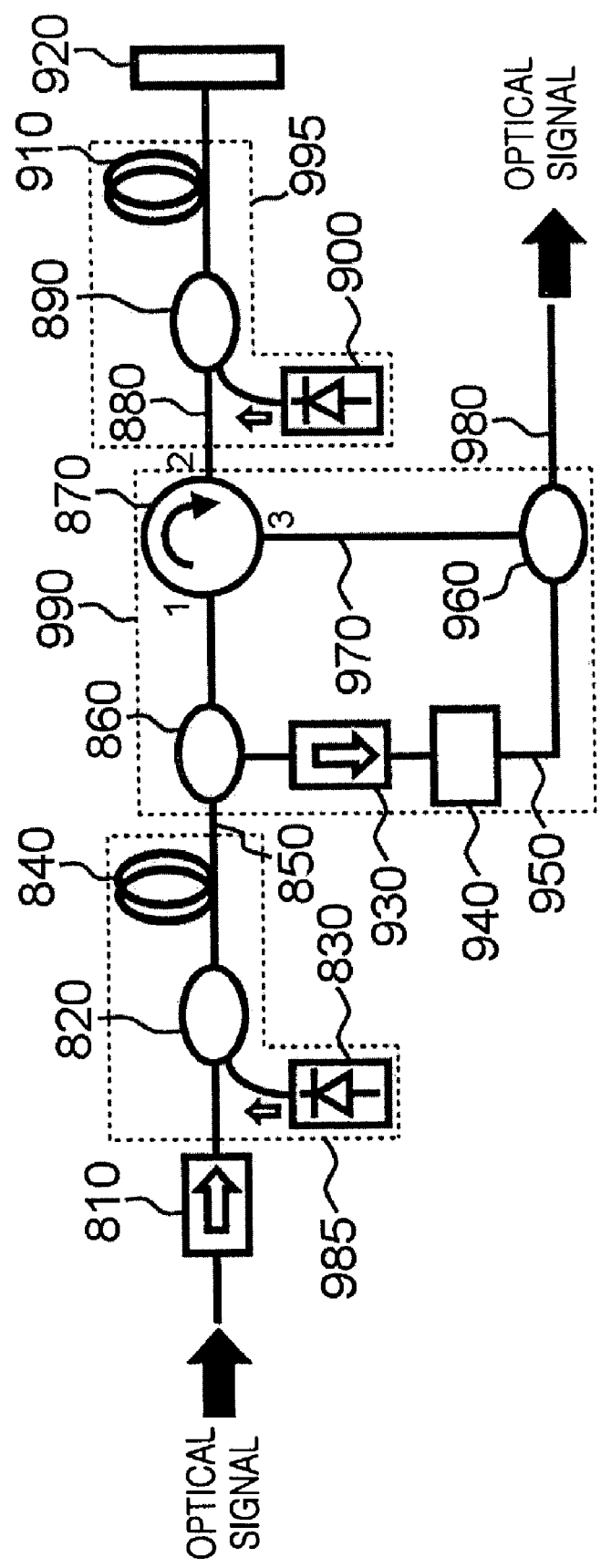
FIG. 4 is a view illustrating a wide band optical fiber amplifier according to a third embodiment of the present invention.

FIG. 4 illustrates the configuration of a wide band optical fiber amplifier according to a third embodiment of the present invention. As shown in FIG. 4, the wide band optical fiber amplifier includes first and second isolators 810 and 930, first and second amplifying units 985 and 995, a gain flattening filter 940, a distributor 990, and a reflecting unit 920. C and L-band In operation, when the C and L-band optical signal components are inputted to the wide band optical fiber amplifier, the C and L-band signals first pass through the first isolator 810, and then the first wavelength selective coupler 820, after which the C and L-band signals enter the first erbium-doped fiber 840. After being amplified in the first erbium-doped fiber 840, the C and L-band optical signal components are applied to the splitter 860. The optical signal applied to the splitter 860 are split into C and L-band optical signal components respectively, whereby the C-band optical signal is output via the fifth path 950 and the L-band optical signal is output to the circulator 870. The circulator 870 outputs the L-band optical signal, received thereto, through its second port. The L-band optical signal output from the second circulator port is then amplified twice in the second erbium-doped fiber 910 by virtue of the reflecting unit 920, and then applied to the second port of the circulator 870 via the second wavelength selective coupler 890. The circulator 870 outputs the twice amplified L-band optical signal, received at its second port, to the fourth path 970 through via the third port of the circulator. The combiner 960 combines the L-band optical signal received via the fourth path 970 with the C-band optical signal received via the fifth path 950, and outputs the combined optical signal.

In conclusion, the wide band optical fiber amplifier according to the present invention provides advantages including making it possible to reduce the power of a pumping light, reducing the length of an erbium-doped fiber, and achieving an enhancement in amplification efficiency by virtue of the signal light passing through an amplifying unit two times as a consequence of a reflecting unit. Moreover, the wide band optical fiber amplifier of the present invention can achieve a minimization in noise figure by reducing the maximum insertion loss of its gain flattening filter by use of the reflecting unit.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A wide band optical fiber amplifier used in an optical transmission system, comprising:
    a first amplifying unit configured for amplifying an optical signal having C and L-band optical signal components;
    a distributor coupled to said first amplifying unit configured for receiving the amplified C and L-band optical signal components via a first path;
    a gain flattening filter coupled to said distributor for receiving said amplified C and L band optical signal components and for gain flattening only said amplified C band optical signal component;
    a first reflector coupled to said gain flattening filter for reflecting said amplified gain flattened C band optical signal component and said amplified L band optical signal component back into said distributor, via said gain flattening filter, said first reflector causing said gain flattened optical signal component to be gain flattened a second time;

a second amplifying unit coupled to said distributor for receiving and amplifying the twice gain flattened amplified C band optical signal component and said amplified L-band optical signal component;

the distributor further configured for receiving said amplified C and L band optical signal components from the second amplifying unit and for splitting the amplified C and L band optical signal components into a separate amplified C and L band optical signal components;

a third amplifying unit coupled to said distributor and configured for amplifying the separate amplified L-band optical signal component;

a second reflector coupled to said third amplifying unit configured for reflecting the separate amplified L band optical signal component back to said distributor via said second amplifying unit; and the distributor further configured for combining the reflected separate amplified L band optical signal component from the third amplifying unit and passing back through the second amplifying unit with the separate amplified C band optical signal component from the second amplifying unit and for outputting the combined signal.

2. The wide band optical fiber amplifier according to claim 1, wherein the distributor further comprises a combiner for combining the amplified separate amplified L band component signal component with the separate amplified C band component signal component.

3. The wide band optical fiber amplifier according to claim 1, wherein the distributor further comprises a circulator for:

receiving the amplified C and L-band optical signal components at a first port via said first path;

outputting the twice gain flattened amplified C band optical signal component and said amplified L-band optical signal component at a second port;

receiving the separate amplified L band component signal component at a third port; and outputting the separate amplified L band component signal component at a fourth port along a fourth path.

4. The wide band optical fiber amplifier according to claim 1, wherein the distributor further comprises a splitter for splitting the amplified C and L band optical signal components into said separate amplified C and L band optical signal components along a fifth path and a third paths, respectively.

5. The wide band optical fiber amplifier according to claim 4, further comprising a second isolator coupled to said splitter for allowing said C-band optical signal component received from the splitter to pass forward while blocking light flowing in the opposite direction.

6. The wide band optical fiber amplifier according to claim 4, further comprising a first and second wavelength selective coupler respectively arranged between the third amplifying unit and the splitter and between the splitter and the second amplifying unit, to cause the second amplifying unit to be pumped by a residual pumping light outputted from the third amplifying unit.

7. The wide band optical fiber amplifier according to claim 1, further comprising a first erbium doped fiber coupled to the input of a first wavelength selective coupler for amplifying the C an L band optical signal components;

a first light source for outputting the first pump light having a first predetermined wavelength toward the first erbium doped fiber; and a first wavelength selective coupler for outputting the pump light from the first light source with the output of the first erbium doped fiber.

8. The wide band optical fiber amplifier according to claim 1, further comprising:

a second erbium doped fiber coupled to the input of the circulator for amplifying the twice gain flattened amplified C band optical signal component and said amplified L-band optical signal component;

a second light source for outputting a second pump light having a second predetermined wavelength toward the second erbium doped fiber; and a second wavelength selective coupler for outputting the pump light from the second light source with the output of the second erbium doped fiber.

9. The wide band optical fiber amplifier according to claim 1, further comprising a first isolator coupled to an input of said amplifier for allowing light inputted to the wide band optical fiber amplifier to pass in a forward direction while preventing light from flowing in a backward direction.

10. The wide band optical fiber amplifier according to claim 1, wherein the third amplifying unit is an erbium doped fiber pumped by a pumping light received via a fourth wavelength selective coupler.

11. A method for use in an optical communication system, said method directed to amplifying an optical signal comprised of a C band optical signal component and an L band optical signal component such that said amplification yields a high amplification efficiency while exhibiting a low noise figure, said method comprising the steps of:

(1) amplifying said optical signal comprised of said C and L band optical signal components at a first amplification stage;

(2) receiving, at a distribution stage, said amplified C and L-band optical signal components from said first amplification stage via a first path;

(3) outputting from said distribution stage, said amplified C and L band optical signal components;

(4) gain flattening, at a gain flattening stage, only said outputted C band optical signal component;

(5) reflecting back to said gain flattening stage, said gain flattened C band optical signal component and L-band optical signal component;

(6) gain flattening again, at said gain flattening stage, said reflected back gain flattened C band optical signal component;

(7) amplifying, at a second amplification stage, said twice gain flattened reflected back C band optical signal component and said reflected back L band optical signal component;

(8) splitting said amplified C and L band optical signal components at step (7) into separate C and L band optical signal components;

(9) outputting, from said distribution stage, said separate L-band optical signal component;

(10) amplifying, at a third amplification stage, said separate L band optical signal component;

(11) reflecting back said amplified separate L band optical signal component at step (10) to said distribution stage;

(12) combining the reflected back amplified separate L band optical signal component at step (11) with said separate C band optical signal component at step (8) to form a combined optical signal; and

(13) outputting the combined optical signal.

12. The method of claim 11, wherein the step of amplifying said optical signal comprised of said C and L band optical signal components at a first amplification stage, further comprises the steps of:

outputting, from the first light source, a first pump light having a first predetermined wavelength toward a first erbium doped fiber; and a first wavelength selective coupler for outputting the pump from the first light source with the output of a first erbium doped fiber.

13. The method of claim 11, wherein the first wavelength is 980 nm.

14. The method of claim 11, wherein the step of amplifying said twice gain flattened reflected back C band optical signal component and said reflected back L band optical signal component further comprises the steps of:

outputting, from a second light source, a second pump light having a second predetermined wavelength toward a second erbium doped fiber; and a second wavelength selective coupler for outputting the pump from the second light source with the output of the second erbium doped fiber.

15. The method of claim 14, wherein the second wavelength is 1480 nm.

* * * * *